W. GLEASON.
Machine for Cutting the Teeth of Metal Gears.
No. 9,468. Reissued Nov. 16, 1880.
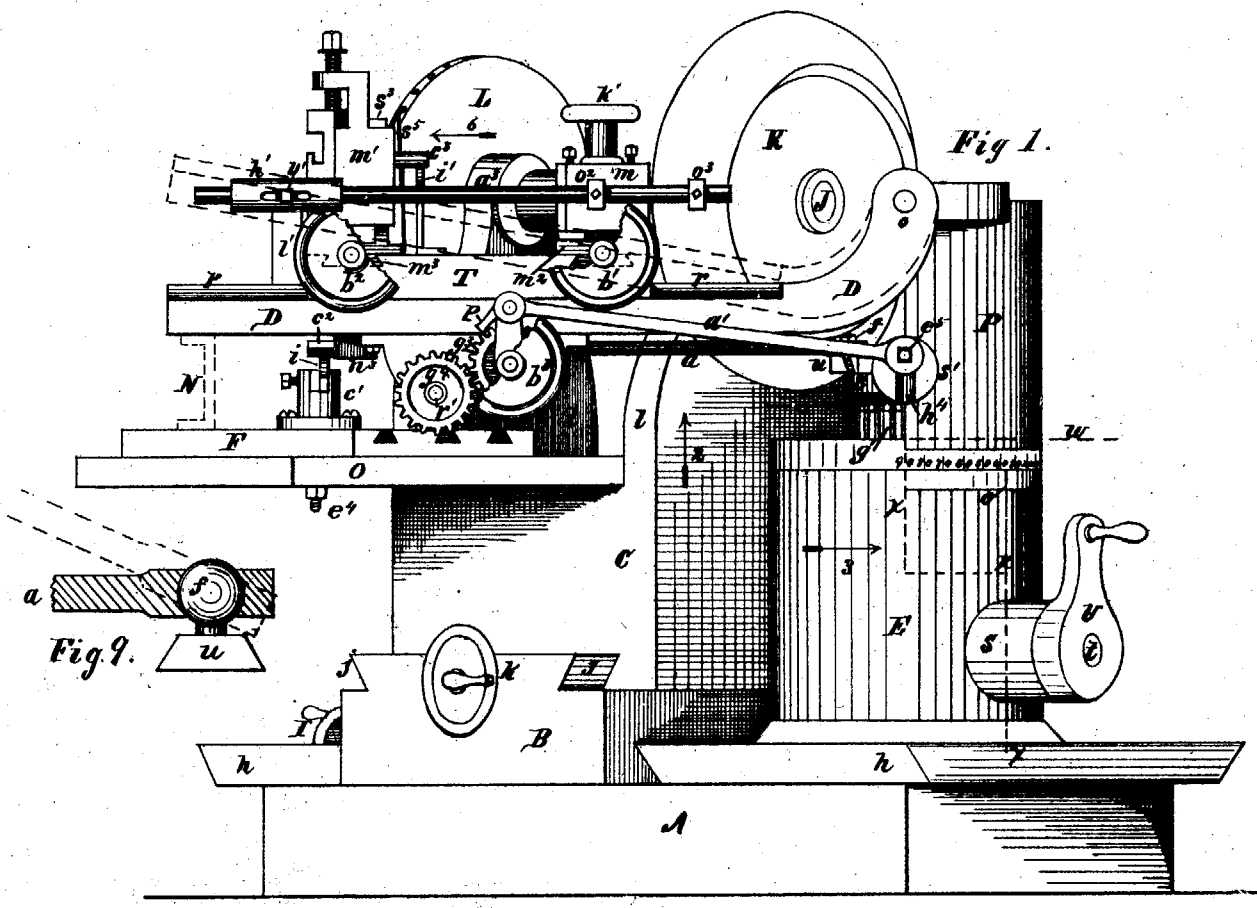
*Witnesses:*
Wm. A. Montgomery
James E. Booth
*Inventor:*
Wm Gleason, per.
Frank H. Clement
Attg.

W. GLEASON.
Machine for Cutting the Teeth of Metal Gears.
No. 9,468. Reissued Nov. 16, 1880.
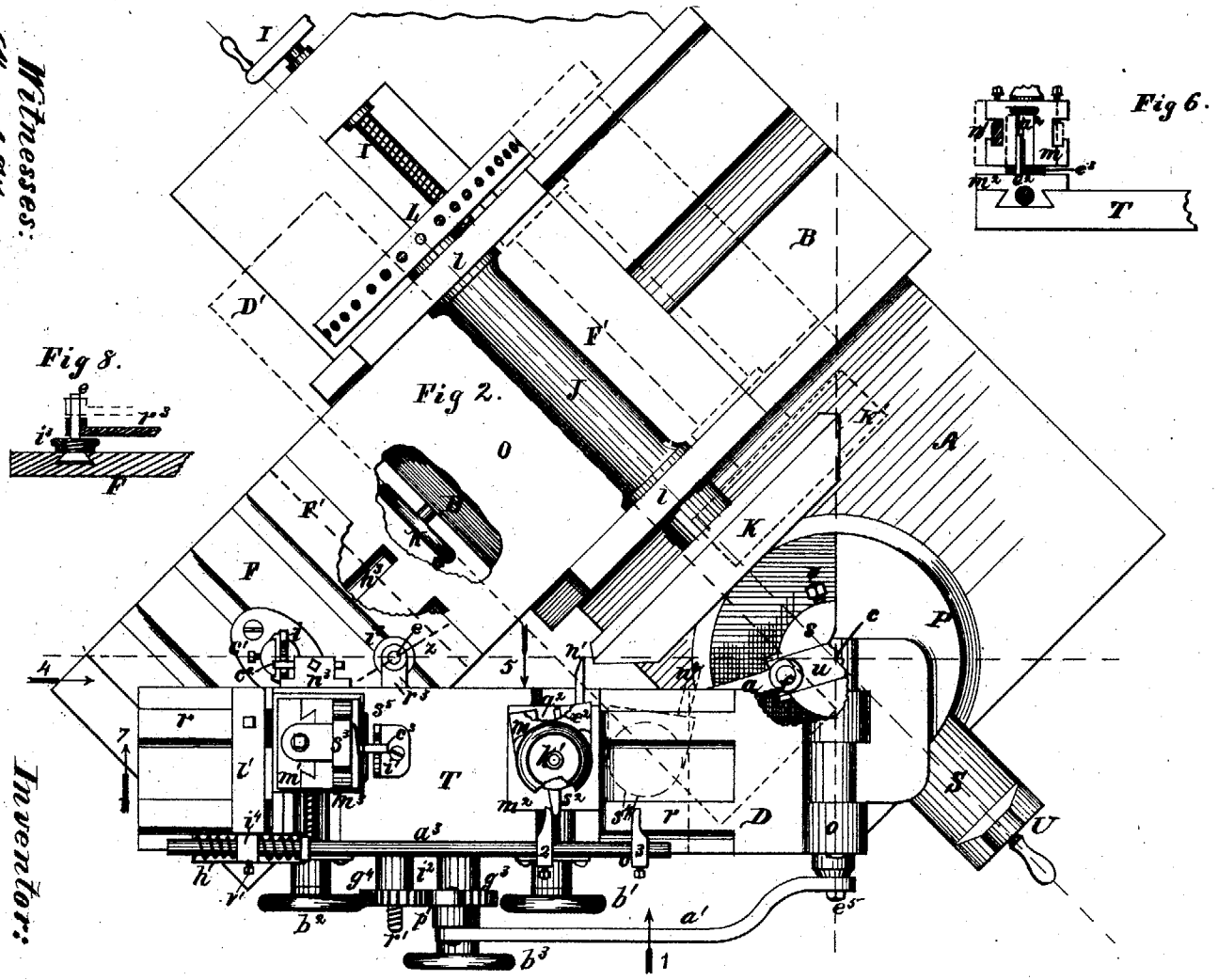
*Witnesses:*
Wm. A. Montgomery
James E. Booth
*Inventor:*
Wm Gleason, per
Frank H. Clement
Atty.

3 Sheets—Sheet 3.
W. GLEASON.
Machine for Cutting the Teeth of Metal Gears.
No. 9,468. Reissued Nov. 16, 1880.
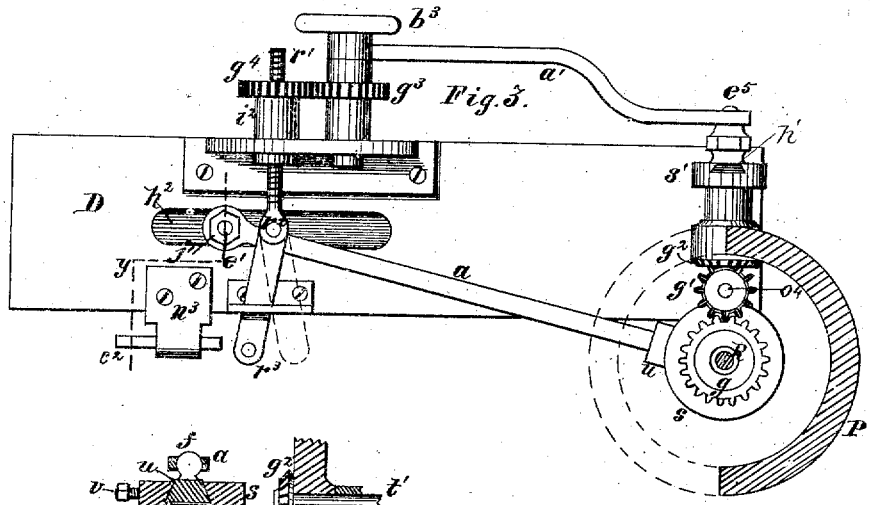
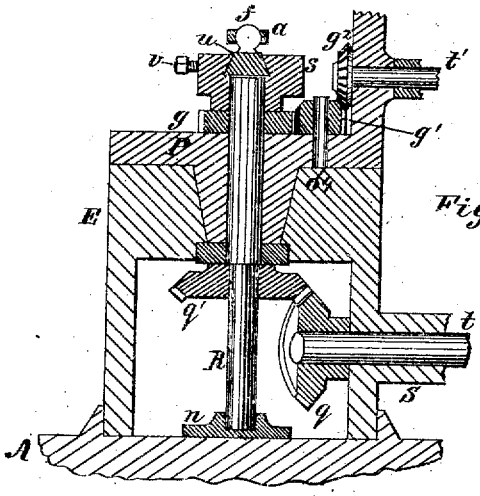
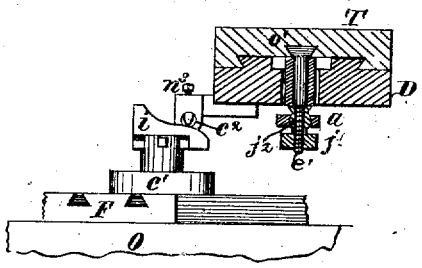
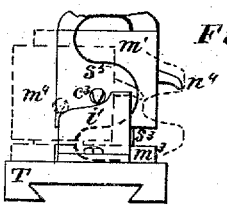
*Witnesses:*
*Wm. A. Montgomery*
*James E. Booth*
*Inventor:*
*Wm Gleason, per*
*Frank H. Clement*
*Atty.*

UNITED STATES PATENT OFFICE.

WILLIAM GLEASON, OF ROCHESTER, NEW YORK.

MACHINE FOR CUTTING THE TEETH OF METAL GEARS.

SPECIFICATION forming part of Reissued Letters Patent No. 9,468, dated November 16, 1880.

Original No. 175,859, dated April 11, 1876. Application for reissue filed March 22, 1880.

DIVISION A.

*To all whom it may concern:*

Be it known that I, WILLIAM GLEASON, of Rochester, in the county of Monroe and State of New York, have invented a new and useful Gear Cutting and Dressing Machine; and I do hereby declare that the following is a full, clear, and exact description thereof, reference being had to the accompanying drawings, making part of this specification, in which—

Figure 1 is a side elevation of my invention, looking in the direction of the arrow 1 in Fig. 2. Fig. 2 is a top or plan view of the same. Fig. 3 is an inverted view of the swinging slide D, looking in the direction of the arrow 2 in Fig. 1, the section being on the dotted line *w* in the same. Fig. 4 is a vertical sectional view of the cylindrical support E and semi-cylindrical-turret P, looking in the direction of the arrow 3 in Fig. 1, the section being on the dotted line *x* in the same. Fig. 5 is a view of a portion of the copying mechanism, looking in the direction of the arrow 4 in Fig. 2, the section being on the dotted line *y* in Fig. 3. Fig. 6 is an elevation of the swivel tool-stock *m*, looking in the direction of the arrow 5 in Fig. 2. Fig. 7 is an elevation of the tool-stock *m'*, looking in the direction of the arrow 6 in Fig. 1. Fig. 8 is a sectional elevation of a portion of the bed-plate F and stud *e*, the section being on the dotted line *z* in Fig. 2. Fig. 9 is a view showing the spherical crank-pin *f*, with a portion of the connecting-rod *a*.

It is well understood by persons versed in gearing that while the teeth of spur-gears may be correctly formed by the revolving cutters as used in the ordinary gear-cutter, those of bevel-gears can be only indifferently well formed by the same means. The error in the teeth of bevel-gears cut in this manner is serious, in causing them to "rattle" when run at a moderately high speed, to "crowd" and run hard, and in subjecting them to an uneven wear. It is also well understood that in a correctly-cut tooth of a bevel-gear every line truly drawn along the surface of either face, or the point of the same, or bottom of the space between the teeth, should tend toward a common central point lying in the plane of the axis of the gear. To produce a machine that will thus correctly dress the teeth of bevel-gears is the object of my invention; but it is equally well calculated to cut the teeth from blanks by first grooving the blank around to the proper depth for the spaces, and then giving to the faces of the teeth the desired curvature, and also to dress spur-gears.

In the drawings, A, Figs. 1 and 2, is a bed-piece, upon which a saddle, B, is secured in such a manner as to permit of longitudinal adjustment on the bed, and upon this saddle a head-stock, C, is similarly attached, its adjustments, however, being lateral, or at right angles to those of the saddle. These adjustments are effected and governed by means of the hand-wheels and screws I *k*.

J is a horizontal spindle, journaled near the top of the posts *l* of the head-stock C, to which is fitted the gear K to be cut, and at the other end of said spindle some suitable indexing apparatus, L, is attached.

O is an extension-piece, reaching out from the side of, and rigidly fastened to, the head-stock C, forming a support for various parts of the machine; and F is a bed-plate, provided with parallel slots in its upper surface, lying upon the extension-piece O, to which it is fastened by the stud $e^4$, Fig. 1, extending down through the slots $h^3$, Fig. 2, of the said piece O.

The upright cylindrical support E is rigidly fixed to the stationary bed-piece A, and has its upper end faced off, and its center bored out conically. The lower or disk portion of the turret P is provided with a substantial bearing in and upon the support E, as shown in Fig. 4.

R is an upright shaft passing centrally through the cylindrical support E and turret P, having its foot resting in a step at *n*. *t* is a horizontal shaft passing centrally through the boss S, in which it has its bearing, and is driven, in the working machines, by a belt running upon a cone-pulley keyed to the outer end of the shaft *t*, in place of the crank U, Figs. 1 and 2. *q* and *q'*, Fig. 4, are bevel or miter gears engaging each other, keyed respectively to the shafts *t* and R. *s* is a hub fastened to the shaft R, and *u* is a dovetailed block or crank-arm sliding therein, which, together with the spherical crank-pin *f*, inserted in the same, forms a crank having an adjustable throw. The block $u$ is held at any desired position of adjustment in the hub $s$ by the set-screw $v$.

D, Figs. 1 and 2, is a swinging slide provided with the dovetailed ways $r$, and attached to the top of the turret P by a horizontal hinge-joint, $o$, by means of which it may swing in a vertical plane, or laterally in a horizontal plane, by means of the bearing the turret P has upon the support E.

T is a sliding saddle, carrying the tool-stocks $m$ and $m'$, sliding upon the ways $r$. $a$ is a rod connecting the crank-pin $f$ with the saddle T, by means of the stud $e'$, reaching down from the same through the slot $h^2$ in the swinging slide D, as shown in Figs. 3 and 5. By means of this connection the saddle T is made to reciprocate upon its ways as the crank $s$ revolves, and the length of its reciprocal motion is regulated by changing the throw of the crank, which is effected by means of the above-mentioned sliding block $u$. The head $o'$ of the stud $e'$ is fitted to a corresponding longitudinal slot cut in the under side of the saddle T, along which it may be moved and fastened at pleasure by loosening the nut $j'$. As the stud $e'$ is made to occupy different positions along said slot, the saddle T is caused to make its reciprocations nearer to or farther from the common center $c$, Fig. 2, this being rendered necessary in cutting bevel-gears of different diameters. The connecting-rod $a$ has its bearing at one end upon the spherical portion $j^2$ of the nut, as shown in Fig. 5, and at the other end upon the spherical crank-pin $f$, Fig. 9, which allows it to take the different positions rendered necessary by the upward and downward movements of the slide D, while following the curve of the tooth being cut, without undue friction or cramping.

The tool-stock $m$, carrying the cutting-tool $n'$, Fig. 2, is mounted upon the upright cylindrical post $e^3$, Figs. 1 and 6, rising from and forming part of the dovetailed slide-block $m^2$, by which it has a swivel movement. The small stud $e^2$, inserted in the said slide-block, and standing upright and within the vertical slot $a^2$, cut in the tool-stock $m$, Figs. 2 and 6, forms a stop by which this motion is arrested when the said tool-stock is at either of the two positions indicated by the full and dotted lines shown in Fig. 6. The slide-block $m^2$, with the tool-stock $m$, is moved horizontally across the saddle T by the hand-wheel $b'$, and the said tool-stock is capable of being raised and lowered upon the post $e^3$ by means of the hand-wheel $k'$.

$h'$, Figs. 1 and 2, is a spring-barrel supported from the slide D, to which it is detachably connected by the bracket $l'$. The horizontal tripping-rod $a^3$ is supported in said spring-barrel, and provided near one end with the adjustable dogs $o^2$ and $o^3$. These dogs are to be so adjusted upon the rod that as the saddle T is carried back by the connecting-rod to the position shown in full lines in Fig. 2, the pin $s^2$, projecting from the tool-stock $m$, is brought in contact with the dog $o^2$, causing the said tool-stock to swing on its above-described bearing until one wall of the slot $a^2$ is brought against the stud $e^2$. This brings the cutting-tool $n'$ into position for the succeeding cut; and when the saddle has advanced to the position shown by the dotted lines in Fig. 2, the said pin $s^2$, as shown in dotted lines at $s^4$, is brought in contact with the dog $o^3$, turning the tool-stock the other way, which "trips" the cutting-tool, as shown at $n^2$, or throws it out, so as not to rub the tooth in its backward movement. The shock of the successive contacts between the pin $s^2$ and the dogs $o^2$ $o^3$ is cushioned by the spiral springs contained within the spring-barrel $h'$ pressing against the sides of the collar $i^4$. This collar is adjustably attached to the rod $a^3$ by means of the set-screw $v'$.

$i$, Figs. 1, 2, and 5, is a copying-form, held in the rest $c'$, which is detachably connected to the bed-plate F.

$c^2$ is a V-shaped hardened steel rider, firmly held in the bracket $n^3$, which is bolted to the under side of the slide D, and said rider presses upon the hardened curved face of the form $i$ by the weight of the swinging slide D. As the latter is moved in the direction of the arrow 7 by the feed-works, hereinafter described, the rider $c^2$ follows the curve of the form, causing the cutting-tool to faithfully copy the same, at a reduced scale, upon the face of the tooth being planed.

To lessen friction, and for other purposes, it may be desirable to substitute a small hardened roll, to follow the form $i$, instead of the fixed rider, as shown.

I design to provide several forms similar to $i$ of various curvatures and sizes, either of which may be fastened in the rest $c'$ and copied, as gears of different shaped and sized teeth may be required.

$g'$, Figs. 1, 3, and 4, is a combined spur and bevel gear revolving upon the fixed stud $o^4$. The spur-teeth of this gear engage with the teeth of the gear $g$, keyed to the shaft R, while the bevel-teeth engage with the teeth of the bevel-gear $g^2$, keyed to the horizontal shaft $t'$. This drives the feed-crank $s'$ and feed-rod $a'$.

$p$, Figs. 1 and 2, is a pawl operated by the feed-rod $a'$, which engages with the teeth of the gear $g^3$, Figs. 1, 2, and 3. This, in turn, drives the gear $g^4$, the motion of which may be regulated at pleasure by moving the stud $e^5$ along the slot $h^4$. The sleeve to which the gear $g^4$ is keyed, extending through the boss $i^2$, Figs. 2 and 3, is threaded internally to fit the screw $r'$, and in the slotted head $r^2$ of the latter the strap $r^3$ is pivoted. The other end of said strap is looped upon the stud $e$, Figs. 2 and 8, which extends upward from a slot in the bed-plate F, and which may be moved to any part of the said slot by loosening the thumb-nut $i^3$. As the gear or nut $g^4$ is caused to turn in either direction, either automatic ally by the pawl in feeding or by the hand-wheel $b^3$, the slide D is made to swing laterally upon its vertical axis $c$, carrying the cutting-tool $n'$ to or from the work, and also up or down on its horizontal axis $o$, by the rider $c^2$ following the form $i$, thus giving the desired contour to the face of the teeth as they are being planed off. This arrangement of the gears $g^3$ and $g^4$ for the feed is preferable, though it may be convenient to dispense with the gear $g^3$, and have the pawl work directly against the teeth of the gear $g^4$.

Great care is used in the construction of the working machines to have the horizontal and vertical axes of the swinging slide D meet in a common point, (represented at $c$, Fig. 2,) and to form a right angle; to have the horizontal axis of the same and the axis of the spindle J in the same horizontal plane; and, in setting the cutting-tool $n'$, to have the point of the same so adjusted as to be on a line with the center $c$, and in the same horizontal plane as the horizontal axis $o$ of the slide D. Then, in whatever position the swinging slide D may be, the direction of motion of the cutting-point of the tool $n'$, when moving forward, will at all times be toward the point $c$.

The slide D is capable of swinging through a horizontal arc of ninety degrees by means of the turret P turning upon its bearing on the cylindrical support E—that is, it occupies a position (represented by the dotted outline D' in Fig. 2) parallel to the spindle J when cutting the teeth of a spur-gear, or out at a right angle from said spindle when cutting the teeth of a crown-gear, or at an intermediate position when cutting the teeth of miter or bevel gears. At the joint between the support E and turret P, commencing at a point directly under the axis $o$, the convex surface of the turret P is graduated a fourth of the way around in degrees of the circle, a corresponding zero-point being marked on the contiguous surface of the support E. The slide D stands in a position parallel to the spindle J when the two zero-points coincide. The axis of motion of the crank $s$ being identical with the vertical axis of the slide D, and the axis of the feed-crank $s'$ being parallel with the horizontal axis $o$ of the same, the connecting-rod $a$ and feed-rod $a'$ will work equally well in whatever position the said slide D may be. When cutting the teeth of crown or very flat bevel-gears with the slide D swung out at, or nearly to, a right angle with the spindle J, a second extension-piece (not shown) is employed, reaching out from the bed-plate F, to hold the form $i$ in a proper position.

In operating my invention, when planing the teeth of a bevel or crown gear, the gear, K, to be planed is fitted on a taper mandrel inserted in the end of the spindle J in the ordinary manner, and brought by the hand-wheels I and $k$ into a position so that the axis of the spindle and the line passing through the outer and inner pitch circles of the teeth (represented by dotted line from $n'$ to $c$, Fig. 2) shall both tend toward the center $c$. The slide D is swung out to correspond with the angle of the bevel, the crank $s$ adjusted to the required throw, and the saddle T brought into place by adjusting the stud $e'$ so that the cutting-tool will move each way slightly beyond the ends of the teeth to be planed. The cutting-point of the tool $n'$, which inclines downward, is brought on an exact level with the horizontal axis $o$ of the slide D by the hand-wheel $k'$, and extended beyond the edge of the said slide to the same distance the center $c$ is therefrom by the hand-wheel $b'$. The dogs $o^2$ and $o^3$ are adjusted to trip the tool properly at each end of the stroke. The stud $e$ is fastened at the proper place in a slot in plate F, the strap $r^3$ looped thereon, and the copying-form $i$ carefully set. A tooth to be planed being indexed into position, the machine is ready to operate. The tool commences its cut at the point of the tooth, and the feed, intermittingly at each successive stroke, carries it thence toward the root of the same, planing off the face of the tooth, the form $i$ being copied on the same as the tool advances. When the tool has reached the root of the tooth the pawl $p$ is thrown back by the attendant, and the slide D brought back to the starting-point by the hand-wheel $b^3$. The next tooth being indexed into position, the operation is repeated, and so on till the corresponding face of every tooth of the gear is planed. If, as is often the case, both faces of the teeth are to be planed, a tool with its point turned upward instead of downward, as shown at $n^4$, Fig. 7, is used to plane the other face; using a copying-form of reverse curvature from the one shown at $i$. If the teeth are to be cut upon a blank, they are first "roughed out" by cutting slots in the face of the blank in the place of the spaces between the teeth, and to the required depth for the same, after which the faces of the teeth are shaped, as above described.

$s^3$, Figs. 1 and 2, is an upright rectangular post, forming a part of the dovetailed slide-block $m^3$, from which it rises, and upon said post the tool-stock $m'$ slides vertically, both of which are moved horizontally across the saddle T by the hand-wheel $b^2$. $i'$, Figs. 1, 2, and 7, is a second copying-form fastened to the upper surface of the saddle T; and $c^3$ is a hardened steel rider projecting from the side of the tool-stock $m'$, and pressed upon the hardened curved surface of the same by the weight of the said tool-stock $m'$, together with the exertion of the serpentine spring $s^5$. As the tool-stock is moved by the hand-wheel $b^2$, or some suitably-arranged feed, from a position represented at $m^4$, Fig. 7, in dotted outline, to the position $m'$, (shown in full lines,) the rider $c^3$ carries the tool-stock and tool $n^4$ gradually upward, the latter tracing the outline of the face of a spur-tooth, as shown in dotted lines. The tool-stock $m'$, form $i'$, &c., as above described, together form an attachment designed to be used when cutting the teeth of spur-gears.

To operate my invention for this purpose the rest $c'$, Figs. 1, 2, and 5, with the form $i$, the stud $e$, and the tool-stock $m$, are removed. The head-stock C is moved by the hand-wheel $k$ more nearly over the middle of the bed-piece A, as shown in dotted lines in Fig. 2. The slide D is swung around parallel to the spindle J, as shown in dotted lines at D'. The bed-plate F is moved to a position under the same, as shown by the dotted lines F', and a post (represented in dotted lines at N in Fig. 1) is interposed between the bed-plate F and slide D, to which both are securely bolted, which forms a support for the latter and holds it immovably in a position exactly parallel to the spindle J. The spur-gear, K', to be cut is fitted to the spindle, and indexed and brought to its place by the hand-wheels I and $k$, all as in the other case. The cutting-tool, held in this case in the tool-stock $m'$, the crank $s$, and other parts, are also adjusted as before described. The feed in this case I effect by attaching a ratchet-wheel to the hub of the hand-wheel $b^2$, and move it by a pawl worked in any ordinary manner; and as the cutting-tool, which commences its cut at the point of the tooth, as before, is carried by the feed forward to the root of the same, it copies onto the face of the tooth the form $i'$ in exact curvature and size. To plane the other face of the tooth a form of reverse curvature from that of $i'$ is employed; or the gear may be put upon the spindle the other side foremost.

What I claim as my invention is—

1. The turret P and slide D, in combination with the gear-spindle J and its supporting-carriage, when the parts are constructed and arranged substantially as shown, whereby their relative position is rendered adjustable to any desired extent, to adapt the machine to cut or dress spur gears or bevels of any angles in the same machine.

2. The combination of the tool-saddle T with the spindle J, turret P, and slide D, when the last three elements are so arranged relatively that their axial lines shall intersect, whereby any vertical or horizontal movement of the cutting-tool shall not affect its radial reciprocation with relation to the axis of the gear-wheel being operated upon, as set forth.

3. In combination with the pivoted turret P, hinged slide D, and reciprocating tool carriage or saddle T, the connecting or governing strap $r^3$ and adjustable pin $e$, whereby, in addition to its reciprocations, the cutting-tool may be made to rise or fall or move toward or from the spindle J, for the purposes set forth.

4. In combination with the slide D and feed-screw $r'$, the adjustable pin $e$ and link or strap $r^3$, when the latter is suitably hinged to the feed-screw, substantially as set forth.

5. In combination with the pin $e$, strap $r^3$, hinged to the feed-screw $r'$, the slide D, adjustable form $i$, and rider $c^2$, arranged to operate conjointly for the purposes set forth.

6. The adjustable automatic feeding mechanism $e^5$ $a'$, reversible pawl $p$, screw $r'$, and hinged link $r^3$, in combination with the slide D and pin $e$, for the purposes set forth.

7. The slide-block $m^2$, pivoted tool-clamp $m$, stop $e^2$, and pin $s^2$, arranged upon the reciprocating saddle T, in combination with the adjustable stops $o^2$ and $o^3$, all operating conjointly, as and for the purposes set forth.

8. The clamping-collar $i^4$, in combination with the springs in the barrel $h'$ and rod $a^3$, whereby the latter is adjustable longitudinally, and at the same time more or less yielding in both directions.

9. The slide-block $m^3$, having a movement laterally across the reciprocating saddle T, tool-stock $m'$, rider $c^3$, and spring $s^5$, in combination with the fixed templet or pattern $i'$ and slide D, when all are arranged as specified, for cutting or dressing the teeth of spur-gears, as shown and described.

10. In combination with the horizontally-revolving crank-arm $u$—adjustable or otherwise—and spherical wrist-pin $f$, the pitman $a$ and rising and falling slide D, for the purposes set forth.

11. The combination of the tool stock or holder $m'$, pattern-plate $i'$, and saddle T with the swinging slide D, when arranged as specified, for cutting spur gears or wheels.

WILLIAM GLEASON.

Witnesses:

F. H. CLEMENT.

HAMLET S. BRIGGS.